United States Patent [19]

Hwang

[11] Patent Number: 5,566,875
[45] Date of Patent: Oct. 22, 1996

[54] LEAD-OXIDE PREVENTING APPARATUS FOR AUTOMATIC LEAD-SOLDERING DEVICE

[75] Inventor: Byung-guk Hwang, Kyungki-do, Rep. of Korea

[73] Assignee: Samsung Electronics Co., Ltd., Kyungki-do, Rep. of Korea

[21] Appl. No.: 474,725

[22] Filed: Jun. 7, 1995

[51] Int. Cl.$^6$ .................................................. B23K 3/06
[52] U.S. Cl. ............................ 228/37; 228/260; 277/135; 415/230
[58] Field of Search .............................. 228/37, 214, 260, 228/56.1, 56.2; 415/229, 230; 277/133, DIG. 6, 135

[56] References Cited

U.S. PATENT DOCUMENTS 4,437,605  3/1984  Tucker et al. ............................ 228/260
4,700,878  10/1987  Ciniglio ..................................... 228/37

*Primary Examiner*—Samuel M. Heinrich
*Attorney, Agent, or Firm*—Sughrue, Mion, Zinn, Macpeak & Seas

[57] ABSTRACT

A lead oxide preventing apparatus for an automatic soldering device does not generate lead oxides around an impeller shaft inside a lead chamber. Industrial waste in the form of heavy-metal-contaminated material is reduced by installing a ring member and by placing an oxidation preventing agent into the ring members, or by installing a beating therein so that the molten lead does not contact portions of the impeller shaft.

4 Claims, 3 Drawing Sheets

LEAD-OXIDE PREVENTING APPARATUS FOR AUTOMATIC LEAD-SOLDERING DEVICE

BACKGROUND OF THE INVENTION

1. Field of the Invention

The present invention relates to a lead-oxide preventing apparatus for an automatic lead-soldering device, and more particularly, to a lead-oxide preventing apparatus whereby industrial waste is reduced and operators are free from potential poisoning by heavy-metal-contaminated materials.

2. Description of the Related Art

In general, as shown in FIGS. 1 and 2, an automatic lead-soldering device used in an automatic production line is constituted such that a motor 12 is installed to one side above a lead chamber 10. A container 20 having a plurality of nozzles 22 formed in a row on the upper portion thereof is installed inside the lead chamber 10, and an impeller shaft 30 is rotatably supported in one side of the container 20 by a bearing 34 within a housing 32. Belt pulleys 36a and 36b serve to allow motor 12 to be coupled to shaft 30 by a timing belt 14. Also, an impeller 38 for generating jets of molten lead 16 is installed at the lower end of impeller shaft 30.

In the automatic lead soldering device having the aforementioned structure, motor 12 drives belt pulleys 36a and 36b to thereby rotate impeller shaft 30 and impeller 38. Thus, jets of molten lead 16 are generated in the direction of the arrows shown in FIG. 1.

Therefore, while molten lead 16 is jetted through nozzles 22 at a predetermined height, a component to be soldered is inserted into the upper portion of nozzles 22 and is covered with molten lead 16.

However, in the aforementioned conventional automatic soldering device, since impeller shaft 30 is rotated while in contact with molten lead 16, molten lead 16 in lead chamber 10 is exposed to the air to a much greater degree because the molten lead circulates in response to the rotation of impeller shaft 30. Accordingly, lead oxide is generated in the form of a black powder, which results in the consumption of molten lead 16. As the black-powder-type lead oxide is generated, the resultant lead dust contaminates the machine, which must therefore be cleaned often. Also, the lead oxide can become airborne and :may be inhaled by operators. Moreover, the lead oxide, an industrial waste, must be disposed of separately and by proper, and expensive, means.

SUMMARY OF THE INVENTION

In order to solve the problems of the prior art, it is therefore an object of the present invention to provide an automatic lead oxide preventing apparatus which prevents the generation of lead oxide by installing a ring member and filling the ring member with an oxidation preventing agent so that molten lead does not contact portions of the impeller shaft and is not exposed to the atmosphere.

To accomplish the above object of the present invention, an impeller shaft is rotatably supported by a bearing in one side of a lead chamber and connected to a motor by a timing belt. An impeller for generating jets of molten lead is disposed in the lead chamber. The invention includes a ring member through which the impeller shaft extends into the lead chamber, and an arm for fixing the ring member to the lead chamber. Upper portions of the impeller shaft are prevented from contacting the surface of the molten lead by injecting an oxidation preventing agent in the ring member.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
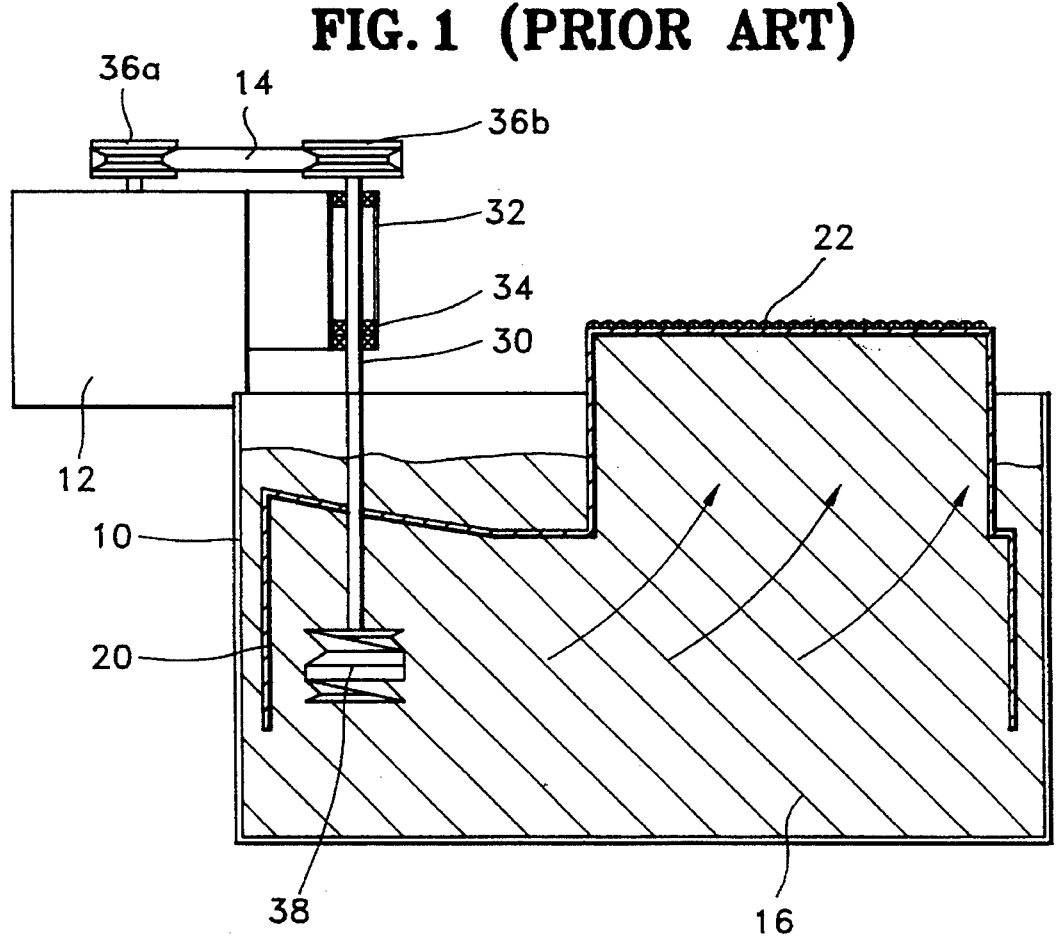
FIG. 1 is a cross-sectional view of a conventional automatic soldering device.
Figure 2:
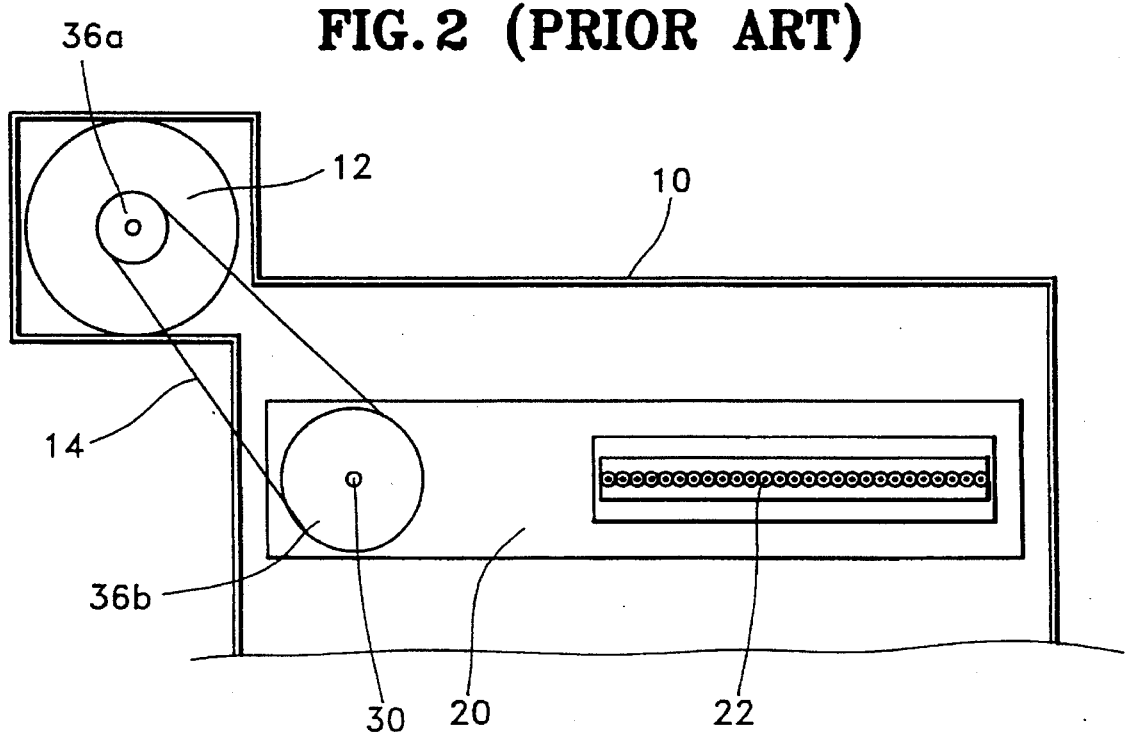
FIG. 2 is a top plan view of the automatic soldering device shown in FIG. 1.

Referring to FIGS. 3–6, a motor 12 is installed above an upper portion of a lead chamber 10. A container 20, whose upper surface has a plurality of nozzles 22 formed in a row therein, is installed within lead chamber 10, and an impeller shaft 30 is rotatably supported by a bearing 34 of a housing 32 in one side of container 20. Belt pulleys 36a and 36b are provided to allow motor 12 to be coupled to impeller shaft 30 by a timing belt 14 and an impeller 38, for generating jets of molten lead 16, is installed in the lower portion of container 20.

Around impeller shaft 30, there is provided a lead oxidation preventing device which prevents upper portions of impeller shaft 30 from contacting the surface of molten lead 16 and also prevents the molten lead from being exposed to the environment. Lead oxidation preventing device includes a ring member 40 positioned such that impeller shaft 30 extends thereinto, and an arm 42 for fixing ring member 40 to lead chamber 10. Ring member 40 is filled with an oxidation preventing agent 44 to a level of about 1–3 cm from the surface of molten lead 16.

Figure 5:
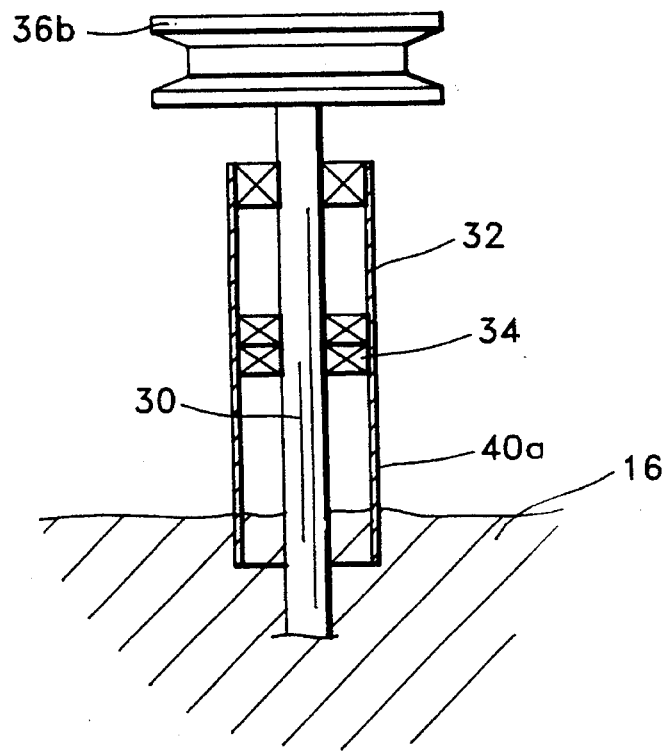
FIGS. 5 and 6 are cross-sectional views of a lead oxide preventing apparatus for an automatic soldering device according to other embodiments of the present invention.
Figure 6:
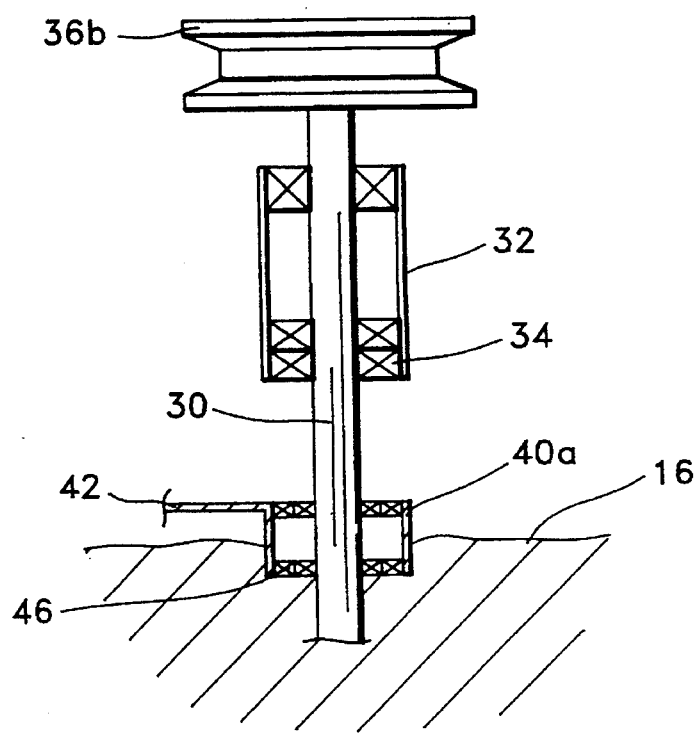

FIGS. 5 and 6 show other embodiments of the present invention. In FIG. 5, a ring member 40a is an integral extension of the lower portion of housing 32 for supporting impeller shaft 30. In FIG. 6, a bearing 46 is inserted into internal upper and lower portions of ring member 40. Other portions of these embodiments are similar to the embodiments discussed above.

Figure 3:
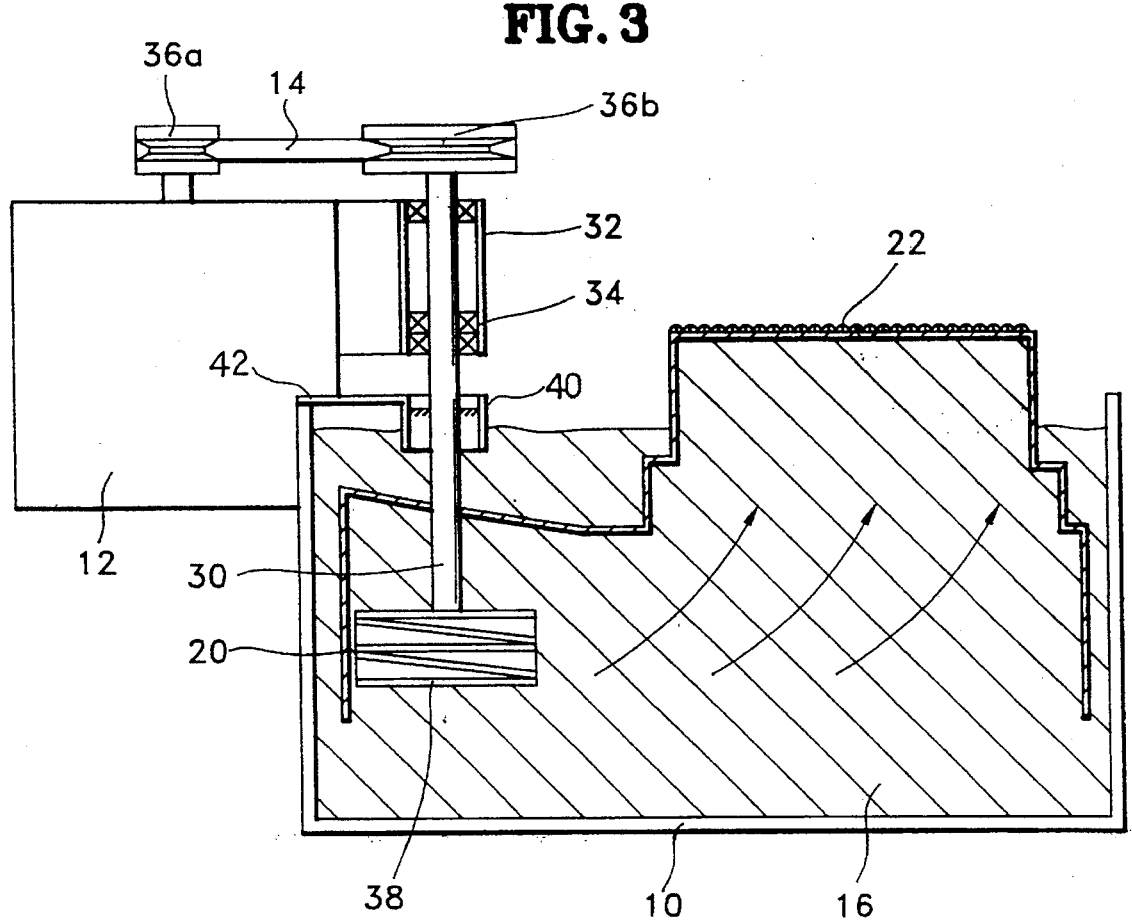
FIG. 3 is a cross-sectional view of a lead oxide preventing apparatus for an automatic soldering device according to an embodiment of the present invention.
Figure 4:
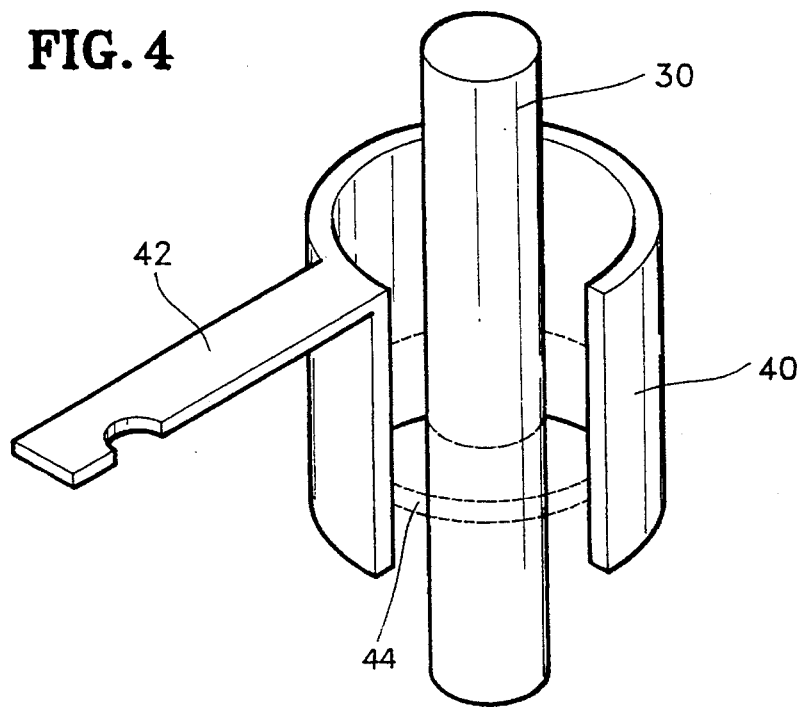
FIG. 4 is a perspective view showing essential features of the present invention.

As shown in FIGS. 3 to 6, in the lead oxide preventing apparatus for an automatic soldering device according to the present invention having the aforementioned structure, jets of molten lead 16 are generated in the direction of the arrows shown in FIG. 3 by virtue of movement of impeller 38.

At this time, since molten lead 16 contained in lead chamber 10 does not travel up impeller shaft 30 because of bearing 46 or an oxidation preventing agent filled in ring member 40 installed around impeller shaft 30, lead oxides are not generated.

Molten lead 16 within container 20 is jetted through nozzles 22 at a predetermined height, and a component to be soldered is inserted into the upper portion of nozzles 22 to be smeared with molten lead 16.

As described above, according to the aforementioned lead oxide preventing apparatus for an automatic soldering device, black-powder-type lead oxides are not generated around impeller shaft 30 because ting members 40 and 40a prevent molten lead 16 from travelling up impeller shaft 30. This is accomplished either by filling an oxidation preventing agent into ting members 40 and 40a, or installing bearing 46 therein. Accordingly, lead consumption due to the generation of lead oxides can be avoided.

Also, even as impeller shaft 30 rotates, since molten lead 16 contained in lead chamber 10 is not exposed to the environment, industrial waste in the form of heavy-metal-contaminated materials is reduced. Operators are thus free from being poisoned by heavy-metal-contaminated materials.

The invention has been described through preferred embodiments. However, various modifications can be made without departing from the scope of the invention as defined by the appended claims.

What is claimed is:

1. A lead oxide preventing apparatus for an automatic soldering device having a container installed within a lead chamber, a plurality of nozzles being formed in the upper portion of the container, an impeller shaft rotatably supported by a bearing in one side of the container and being coupled to a motor, and an impeller for generating jets of molten lead being disposed on a lower portion of the impeller shaft, said apparatus comprising:

a ring member, said impeller shaft extends through said ring member into said lead chamber; and an arm formed on said ring member and coupled to said lead chamber, an oxidation preventing agent disposed in said ring member at a predetermined thickness from the surface of said molten lead in said ring member, whereby said molten lead is prevented from contacting portions of said impeller shaft which are inside and above said ring member.

2. A lead oxide preventing apparatus for an automatic soldering device as claimed in claim 1, wherein said predetermined thickness is in the range of 1~3 cm.

3. A lead oxide preventing apparatus for an automatic soldering device as claimed in claim 1, further comprising:

a bearing disposed in said ring member.

4. A lead oxide preventing apparatus for an automatic soldering device as claimed in claim 1, wherein said ring member is an integral extension of a lower portion of a housing which supports, said impeller shaft.

* * * * *